United States Patent
Makita

(10) Patent No.: US 9,459,563 B2
(45) Date of Patent: Oct. 4, 2016

(54) SPACING DEVICE AND IMAGE FORMING APPARATUS

(71) Applicant: FUJI XEROX CO., LTD., Tokyo (JP)

(72) Inventor: Shota Makita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/692,072

(22) Filed: Apr. 21, 2015

(65) Prior Publication Data

US 2016/0170331 A1    Jun. 16, 2016

(30) Foreign Application Priority Data

Dec. 11, 2014  (JP) ................................. 2014-250720

(51) Int. Cl.
  *G03G 15/16*   (2006.01)
  *F16H 13/10*   (2006.01)
  *F16H 53/04*   (2006.01)

(52) U.S. Cl.
  CPC .............. *G03G 15/16* (2013.01); *F16H 13/10* (2013.01); *F16H 53/04* (2013.01)

(58) Field of Classification Search
  CPC ........................... G03G 15/16; G03G 21/181
  See application file for complete search history.

(56) References Cited

U.S. PATENT DOCUMENTS

| | | | |
|---|---|---|---|
| 5,666,608 A * | 9/1997 | Christensen | G03G 15/025 399/115 |
| 6,665,507 B1* | 12/2003 | Hooper, III | G03G 15/0813 399/110 |
| 2011/0081165 A1* | 4/2011 | Kwon | G03G 15/0131 399/121 |
| 2013/0164028 A1* | 6/2013 | Morioka | G03G 21/1821 399/111 |
| 2015/0125181 A1* | 5/2015 | Oguni | G03G 15/16 399/121 |

FOREIGN PATENT DOCUMENTS

| | | |
|---|---|---|
| JP | 2000-320537 A | 11/2000 |
| JP | 2004-078212 A | 3/2004 |

* cited by examiner

*Primary Examiner* — Sandra Brase
(74) *Attorney, Agent, or Firm* — Oliff PLC

(57) ABSTRACT

A spacing device includes a spacing member that spaces first and second rotating bodies having first and second shaft portions, respectively, apart from each other. The spacing member is provided on the second shaft portion and includes a supporting portion that supports the first rotating body; and an opening through which the second shaft portion extends and including an idling portion that allows a hook part of the second shaft portion to rotate idle, and a catching portion that catches the hook part. The first and second rotating bodies are spaced apart when the hook part is in the catching portion and the first rotating body is supported by the supporting portion. The first and second rotating bodies are allowed to rotate when the spacing member rotates until the supporting portion is oriented downward in a direction of gravitational force and the hook part moves to the idling portion.

9 Claims, 14 Drawing Sheets

SPACING DEVICE AND IMAGE FORMING APPARATUS

CROSS-REFERENCE TO RELATED APPLICATIONS

This application is based on and claims priority under 35 USC 119 from Japanese Patent Application No. 2014-250720 filed Dec. 11, 2014.

BACKGROUND

Technical Field

The present invention relates to a spacing device and an image forming apparatus.

SUMMARY

According to an aspect of the invention, there is provided a spacing device including at least one spacing member that spaces a first rotating body and a second rotating body apart from each other, the first rotating body having a first shaft portion, the second rotating body having a second shaft portion, one of the first rotating body and the second rotating body being movable toward and coming into contact with another. The spacing member is provided on one of the first shaft portion and the second shaft portion and includes a supporting portion that supports one of the first rotating body and the second rotating body that is free of the spacing member, and a portion having an opening through which the one of the first shaft portion and the second shaft portion extends, the opening including an idling portion and a catching portion, the idling portion allowing a hook part included in the one of the first shaft portion and the second shaft portion to rotate idle, the catching portion being provided between the supporting portion and the idling portion and catching the hook part. The first rotating body and the second rotating body are spaced apart from each other when the hook part is in the catching portion of the spacing member and the one of the first rotating body and the second rotating body is supported by the supporting portion of the spacing member. The first rotating body and the second rotating body are allowed to rotate when the one of the first rotating body and the second rotating body is rotated and causes the spacing member to rotate until the supporting portion of the spacing member is oriented downward in a direction of gravitational force and the hook part that has been in the catching portion of the spacing member moves to the idling portion.

BRIEF DESCRIPTION OF THE DRAWINGS

Exemplary embodiments of the present invention will be described in detail based on the following figures, wherein.

DETAILED DESCRIPTION

The following exemplary embodiments of the present invention describe exemplary spacing devices and exemplary image forming apparatuses that embody the technical spirit of the present invention, and are not intended to limit the present invention thereto. The present invention is also equally applicable to any other exemplary embodiments included in the scope of the appended claims.

First Exemplary Embodiment

Referring to FIGS. 1 to 4E, a spacing device 78 and an image forming apparatus 10 including the spacing device 78 according to a first exemplary embodiment will now be described. First, the image forming apparatus 10 in a state where spacing by the spacing device 78 has been disabled will be described with reference to FIGS. 1, 2A, and 2B.

Figure 1:
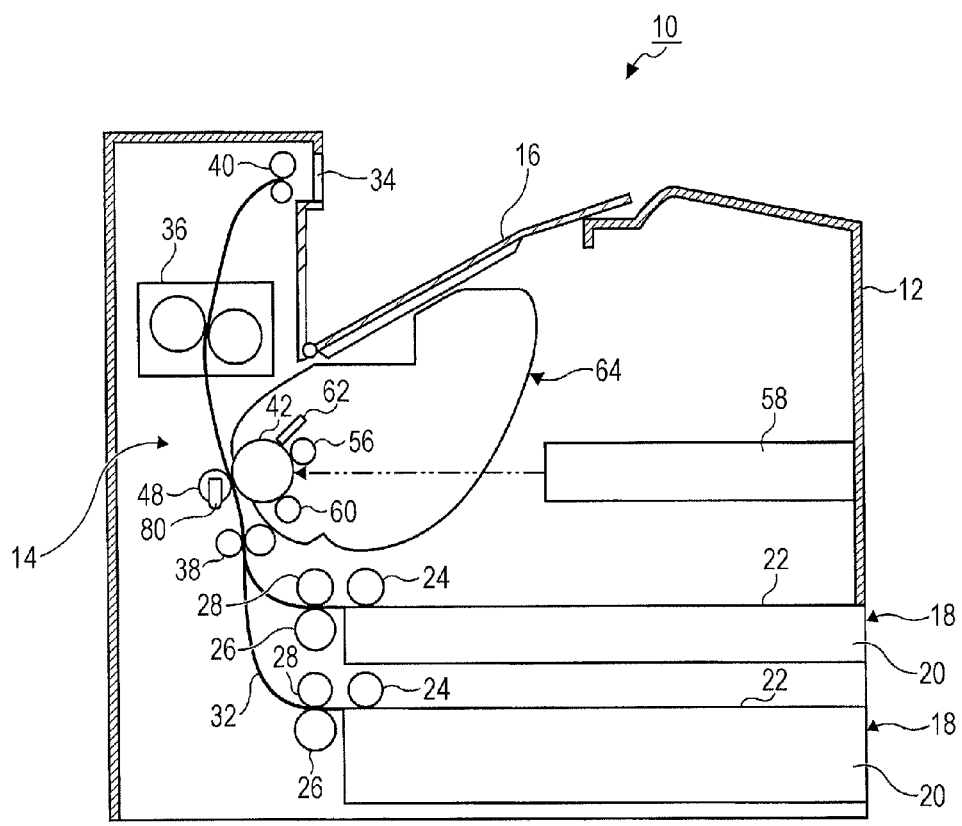
FIG. 1 is a sectional side view of an image forming apparatus according to a first exemplary embodiment.

As illustrated in FIG. 1, the image forming apparatus 10 according to the first exemplary embodiment includes an image-forming-apparatus body 12 that houses at least one sheet feeding unit 18, an image forming section 14, and a fixing device 36. A discharge port 34 is provided in an upper portion of the image-forming-apparatus body 12. A transport path 32 along which a recording medium, such as recording paper, as a transfer object is transported extends through the foregoing elements. The elements will now be described individually.

The sheet feeding unit 18 includes a sheet-feeding-unit body 20, a sheet cassette 22 that contains a stack of recording media as transfer objects, a pickup roller 24 that picks up the top one of the recording media stacked in the sheet cassette 22, and a pair of a feed roller 28 and a retard roller 26 that separate the top one of the recording media, if two or more have been picked up, from the others and feed the top one. When the pickup roller 24, the feed roller 28, and the retard roller 26 rotate, the recording media stacked in the sheet cassette 22 are sequentially transported along the transport path 32 to a pair of registration rollers 38 to be described below. The sheet cassette 22 is detachably attached to the sheet-feeding-unit body 20. The number of sheet feeding units may be one or more. In the first exemplary embodiment, two sheet feeding units 18 are provided as illustrated in FIG. 1.

The image forming section 14 employs an electrophotographic system and includes an image carrying body 42 as a first rotating body; a charging device 56 including, for example, a charging roller that evenly charges the image carrying body 42; an optical drawing device 58 that draws a latent image with light on the image carrying body 42 charged by the charging device 56; a developing device 60 that includes a developing roller and visualizes the latent image, formed on the image carrying body 42 by the optical drawing device 58, into a toner image with toner; a transfer device 48 as a second rotating body that transfers the toner image formed by the developing device 60 to a recording medium; a cleaning device 62 that removes residual toner from the image carrying body 42; and the fixing device 36 that fixes the toner image transferred to the recording medium by the transfer device 48 to the recording medium.

Figure 2A:
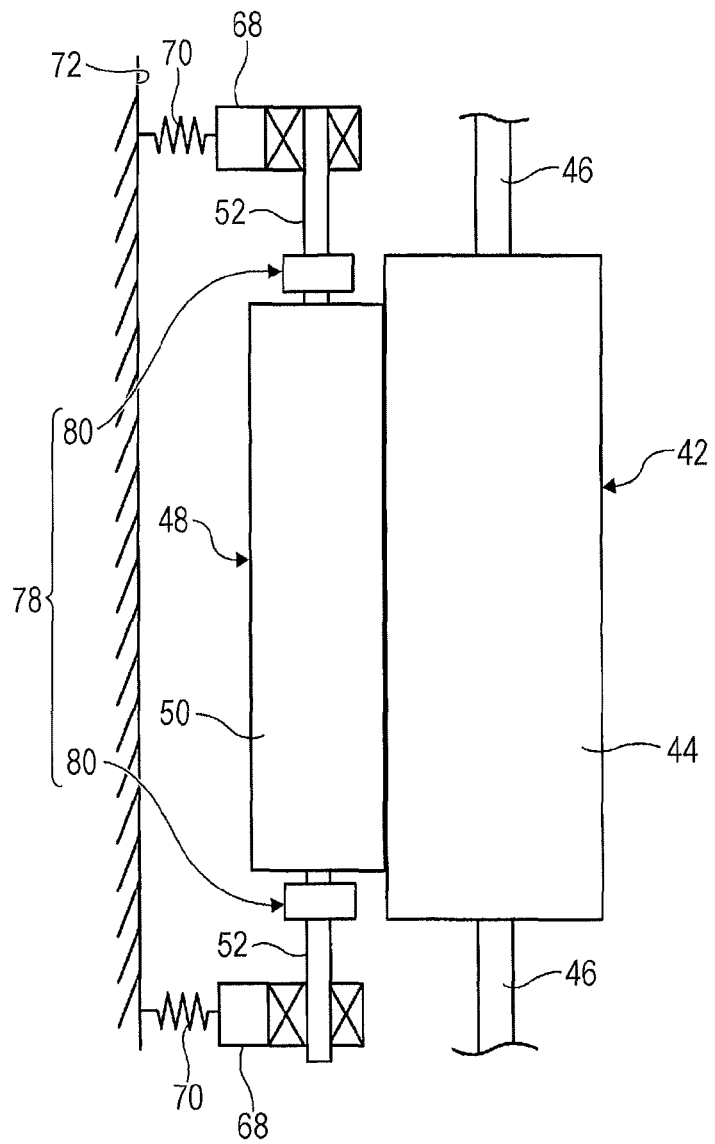
FIGS. 2A and 2B are a plan view and a side view, respectively, illustrating a first rotating body, a second rotating body, and a spacing device of the image forming apparatus according to the first exemplary embodiment that is in use.
Figure 2B:
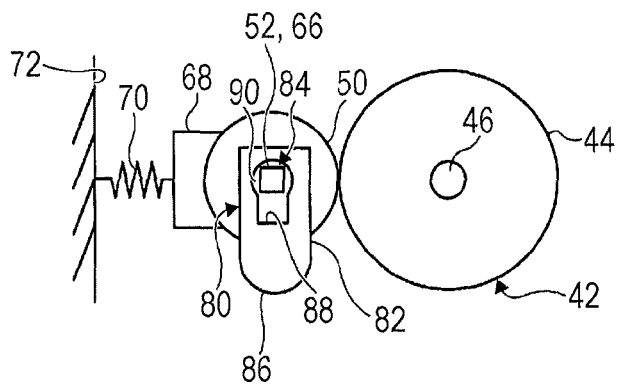

Referring now to FIGS. 2A and 2B, the image carrying body 42 includes an image-carrying-body drum 44 having a predetermined diameter, and a first shaft portion 46 extending through the image-carrying-body drum 44 with two ends thereof projecting from two respective ends of the image-carrying-body drum 44. The ends of the first shaft portion 46 are rotatably attached to a frame body (not illustrated). The transfer device 48 includes a transfer roller 50 having a predetermined diameter, and a second shaft portion 52 extending through the transfer roller 50 with two ends thereof projecting from two respective ends of the transfer roller 50. The ends of the second shaft portion 52 are attached to respective bearings 68 that are provided with respective urging members 70 such as springs. The transfer device 48 is in contact with the image carrying body 42 while being pushed toward the image carrying body 42 by the urging members 70 provided to the transfer device 48. The urging members 70 are attached to a frame body 72 included in the image-forming-apparatus body 12.

The image-carrying-body drum 44 of the image carrying body 42 is longer than the transfer roller 50 of the transfer device 48 and has a larger diameter than the transfer roller 50. Spacing members 80 included in the spacing device 78 to be described below are provided on the second shaft portion 52 and on two respective sides of the transfer roller 50, which is shorter than the image-carrying-body drum 44 of the image carrying body 42, in such a manner as to face the image-carrying-body drum 44. FIGS. 2A and 2B illustrate a state where the image forming apparatus 10 is ready to be used. Therefore, the spacing members 80 hang down under their own weights, and the image-carrying-body drum 44 of the image carrying body 42 and the transfer roller 50 of the transfer device 48 are in contact with each other.

The optical drawing device 58 includes, for example, a scanning laser exposure device and moves along a process cartridge 64 to be described below, thereby forming a latent image on the image carrying body 42. Other exemplary embodiments of the optical drawing device 58 include a light-emitting diode (LED) and a surface emitting laser. The process cartridge 64 is a unit including the image carrying body 42, the charging device 56, the developing device 60, and the cleaning device 62 and is replaceable as a unit. The process cartridge 64 is able to be removed from the image-forming-apparatus body 12 when a discharge portion 16 is opened.

The transport path 32 is a path of the recording medium and extends from the pickup roller 24 of each of the sheet feeding units 18 at the bottom of the image-forming-apparatus body 12 through to the discharge port 34 at the top of the image-forming-apparatus body 12. The transport path 32 includes a portion extending substantially vertically from the pickup roller 24 of each of the sheet feeding units 18 at the bottom to the fixing device 36 in the image-forming-apparatus body 12.

The transfer device 48 and the image carrying body 42 are provided on the upstream side of the transport path 32 with respect to the fixing device 36. Furthermore, the pair of registration rollers 38 are provided on the upstream side of the transport path 32 with respect to the transfer device 48 and the image carrying body 42. Furthermore, a pair of discharge rollers 40 are provided at a position of the transport path 32 near the discharge port 34.

The top one of recording media that are picked up from the sheet cassette 22 of one of the sheet feeding units 18 by the pickup roller 24 is separated from the others by the retard roller 26 and the feed roller 28 and is guided into the transport path 32. The recording medium is temporarily stopped by the pair of registration rollers 38. Then, at a suitable timing, the recording medium is transported through a nip between the transfer device 48 and the image carrying body 42, whereby a toner image is transferred to the recording medium. The toner image is fixed to the recording medium by the fixing device 36. Then, the recording medium is discharged from the discharge port 34 onto the discharge portion 16 by the pair of discharge rollers 40.

The spacing device 78 included in the image forming apparatus 10 will now be described. As illustrated in FIGS. 2A and 2B, the spacing device 78 is provided on the second shaft portion 52 included in the transfer device 48 as the second rotating body. Before the image forming apparatus 10 starts to be used, the transfer device 48 and the image carrying body 42 are spaced apart from each other by the spacing device 78 so that the transfer roller 50 of the transfer device 48 and the image-carrying-body drum 44 of the image carrying body 42 are prevented from being kept in contact with each other for a long time.

The spacing device 78 includes two spacing members 80 provided on the second shaft portion 52 and on the two respective sides of the transfer device 48.

The spacing members 80 will now be described, focusing on one of the two because the two spacing members 80 have the same configuration. As illustrated in FIGS. 2A to 3B, the spacing member 80 includes a plate-like spacing-member body 82 having a predetermined thickness. The spacing-member body 82 has an opening 84 extending therethrough, and a supporting portion 86 provided at one longitudinal-direction end thereof. The opening 84 receives the second shaft portion 52. The supporting portion 86 supports the image-carrying-body drum 44 of the image carrying body 42 when the image carrying body 42 and the transfer device 48 are spaced apart.

The opening 84, through which the second shaft portion 52 of the transfer device 48 extends, includes a catching portion 88 and an idling portion 90. The catching portion 88 catches a hook part 66 included in the second shaft portion 52 extending through the opening 84. The second shaft portion 52 is allowed to rotate idle in the idling portion 90.

The catching portion 88 is provided on a side of the opening 84 that is nearer to the supporting portion 86 than the idling portion 90. The idling portion 90 is provided at a position farther from the supporting portion 86 than the center of mass of the spacing member 80. The position of the catching portion 88 is determined by the length between the catching portion 88 and the supporting portion 86 of the spacing member 80. The length is long enough to space the transfer device 48 and the image carrying body 42 apart from each other in a state where the spacing member 80 is on the second shaft portion 52 and is supporting the image-carrying-body drum 44 of the image carrying body 42 by being in contact therewith (see FIGS. 3A and 3B).

The catching portion 88 has a shape that allows the catching portion 88 to catch the hook part 66 of the second shaft portion 52. In the first exemplary embodiment, as illustrated in FIGS. 2B and 3B, the hook part 66 of the second shaft portion 52 has a rectangular cross-sectional shape. Therefore, the catching portion 88 of the spacing member 80 according to the first exemplary embodiment has a rectangular shape whose three sides are defined by straight lines so that the hook part 66 of the second shaft portion 52 fits therein. The cross-sectional shape of the hook part 66 is not limited to a rectangular shape and may be any other polygonal or substantially polygonal shape such as a triangular shape or a pentagonal shape.

The idling portion 90 has a size and a shape that allow the hook part 66 of the second shaft portion 52 to rotate idle therein. In the first exemplary embodiment, the idling portion 90 has a circular shape as illustrated in FIGS. 2B and 3B.

The spacing member 80 is provided on the second shaft portion 52 and on each of the two sides of the transfer roller 50 of the transfer device 48. The supporting portion 86 of the spacing member 80 comes into contact with and supports the image-carrying-body drum 44 of the image carrying body 42. In this state, the transfer device 48 and the image carrying body 42 are spaced apart from each other.

Figure 3A:
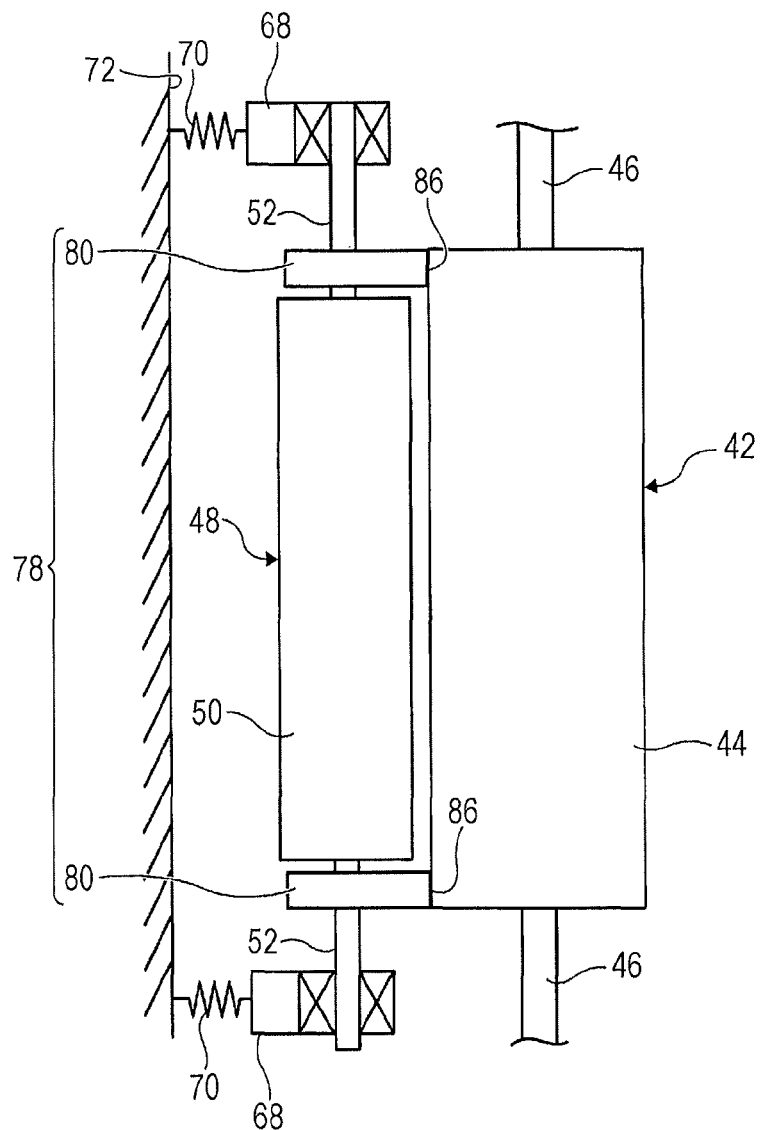
FIGS. 3A and 3B are a plan view and a side view, respectively, illustrating the first rotating body, the second rotating body, and the spacing device of the image forming apparatus according to the first exemplary embodiment that is yet to be used.
Figure 3B:
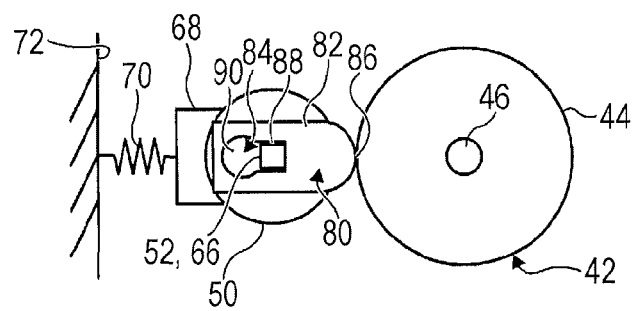

Referring now to FIGS. 3A to 4E, a way in which the spacing device 78 according to the first exemplary embodiment works will be described. In FIGS. 4A to 4E, the bearing 68 is not illustrated. In the image forming apparatus 10 that is yet to be used, the spacing member 80 of the spacing device 78 is oriented in such a manner as to space the transfer device 48 and the image carrying body 42 apart from each other as illustrated in FIGS. 3A, 3B, and 4A. In this state, the spacing member 80 is being pushed toward the image carrying body 42 by the urging member 70 provided to the transfer device 48. Furthermore, the hook part 66 of the second shaft portion 52 is in the catching portion 88 of the opening 84. Hence, the spacing member 80 is prevented from being disengaged from the hook part 66.

Figure 4A:
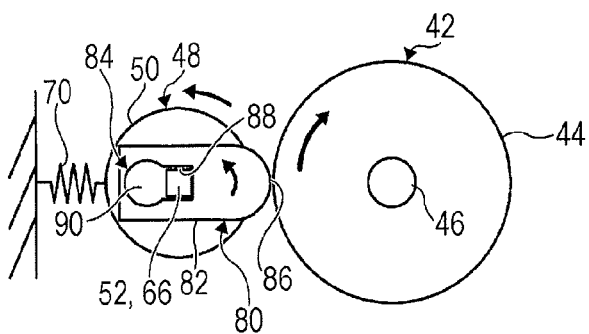
FIGS. 4A to 4E are side views illustrating a way in which the spacing device according to the first exemplary embodiment works.

At the first use of the image forming apparatus 10, the image carrying body 42 receives power (not illustrated) and rotates clockwise in FIG. 4A. The rotation of the image carrying body 42 is transmitted to the transfer device 48, and the transfer device 48 rotates counterclockwise. In this process, the rotation of the image carrying body 42 is first transmitted to the spacing member 80 that is in contact with and is thus supporting the image-carrying-body drum 44 of the image carrying body 42. Following the rotation of the image carrying body 42, the spacing member 80 rotates about the second shaft portion 52. The spacing member 80 rotates while catching the hook part 66 of the second shaft portion 52 at the catching portion 88 of the opening 84 thereof, whereby the transfer device 48 also rotates.

Figure 4B:
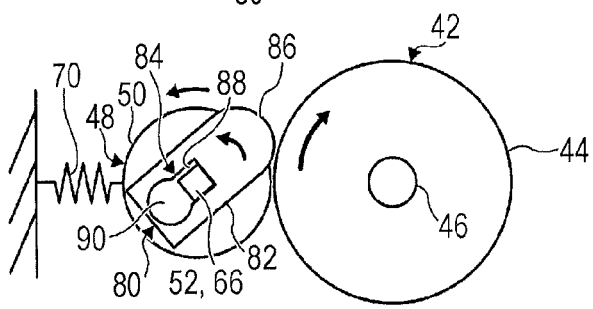

When the spacing member 80 rotates by a certain angle, referring now to FIG. 4B, the supporting portion 86 of the spacing member 80 that has supported the image-carrying-body drum 44 of the image carrying body 42 goes out of contact with the image-carrying-body drum 44. Hence, the image-carrying-body drum 44 and the transfer roller 50 of the transfer device 48 come into contact with each other because the urging member 70 provided to the transfer device 48 is pushing the transfer device 48 toward the image carrying body 42.

Figure 4C:
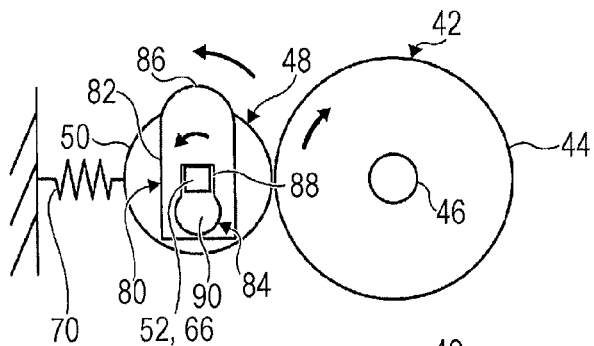
Figure 4D:
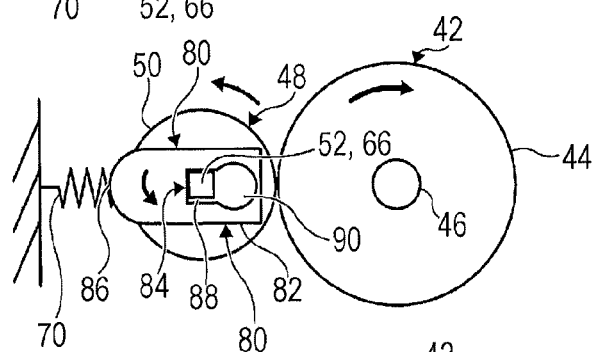

Since the rotation of the image carrying body 42 causes the transfer device 48 to rotate, referring now to FIGS. 4C and 4D, the spacing member 80 further rotates. In this process, since the catching portion 88 of the opening 84 is catching the hook part 66 of the second shaft portion 52, the spacing member 80 rotates with the rotation of the second shaft portion 52.

Figure 4E:
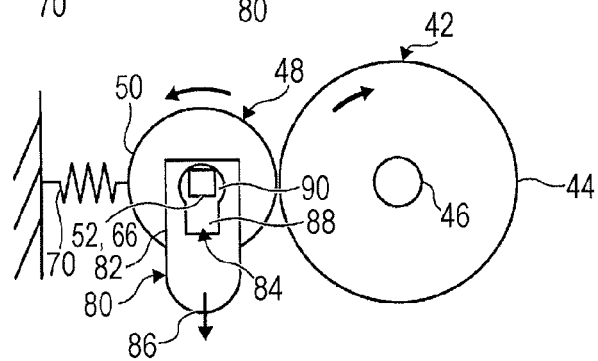

As the spacing member 80 further rotates and the side of the spacing member 80 that serves as the supporting portion 86 starts to move downward from the horizontal position, referring now to FIG. 4E, the side of the spacing member 80 that serves as the supporting portion 86 is pulled by the gravitational force and is oriented downward. In this state, the hook part 66 of the second shaft portion 52 that has been in the catching portion 88 of the opening 84 moves to the idling portion 90.

When the side of the spacing member 80 that serves as the supporting portion 86 is oriented downward in the direction of gravitational force, the hook part 66 of the second shaft portion 52 is positioned in the idling portion 90 of the opening 84. Therefore, even if the transfer device 48 rotates, the hook part 66 of the second shaft portion 52 rotates idle in the idling portion 90. Hence, the spacing member 80 stops rotating.

In the above manner, the spacing of the transfer device 48 and the image carrying body 42 by the spacing device 78 is disabled. Consequently, as illustrated in FIGS. 1, 2A, and 2B, the image forming apparatus 10 becomes ready to be used.

First Modification

A spacing device and an image forming apparatus according to a first modification of the first exemplary embodiment will now be described with reference to FIGS. 5A to 5E. Elements that are the same as those of the spacing device 78 and the image forming apparatus 10 according to the first exemplary embodiment are denoted by corresponding ones of the reference numerals used in the first exemplary embodiment, and detailed description thereof is omitted.

The first exemplary embodiment concerns a case where the hook part 66 of the second shaft portion 52 that is to be caught by the spacing member 80 of the spacing device 78 has a rectangular cross-sectional shape. The first modification illustrated in FIGS. 5A to 5E employs a second shaft portion 52A having a circular cylindrical shape or a substantially circular cylindrical shape, with a part thereof forming a flat or substantially flat part extending in the longitudinal direction thereof. That is, the second shaft portion 52A has a so-called D-cut shape. The flat or substantially flat part of the second shaft portion 52A serves as a hook part 66A and is to be caught by a catching portion 88A of an opening 84A provided in a spacing member 80A of a spacing device 78A. In FIGS. 5A to 5E, the bearing 68 is not illustrated.

Figure 5A:
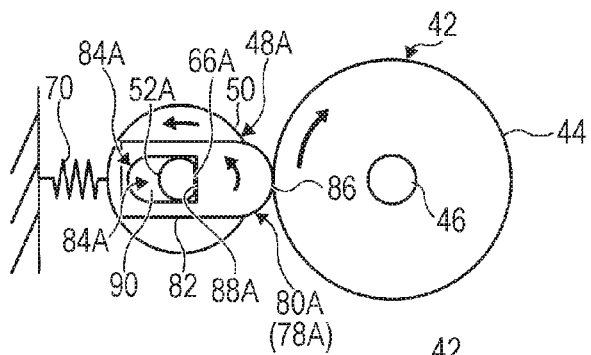
FIGS. 5A to 5E are side views illustrating a way in which a spacing device according to a first modification of the first exemplary embodiment works.
Figure 5B:
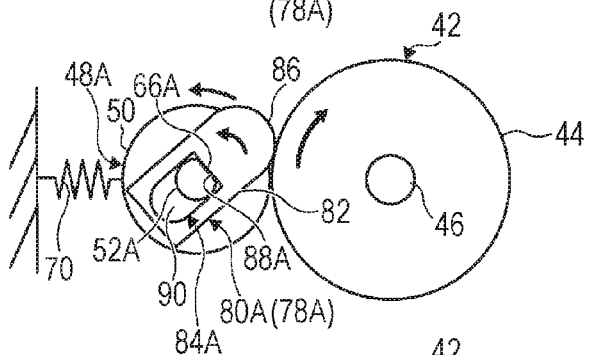

A way in which the spacing device 78A according to the first modification works is as follows. In FIG. 5A, a transfer device 48A and the image carrying body 42 are spaced apart from each other by the spacing member 80A. When the image carrying body 42 rotates clockwise in FIG. 5A, the spacing member 80A provided on the second shaft portion 52A of the transfer device 48A rotates counterclockwise and causes the transfer device 48A to rotate counterclockwise. When the spacing member 80A rotates in such a manner, the transfer roller 50 of the transfer device 48A and the image-carrying-body drum 44 of the image carrying body 42 come into contact with each other (as illustrated in FIG. 5B).

Figure 5C:
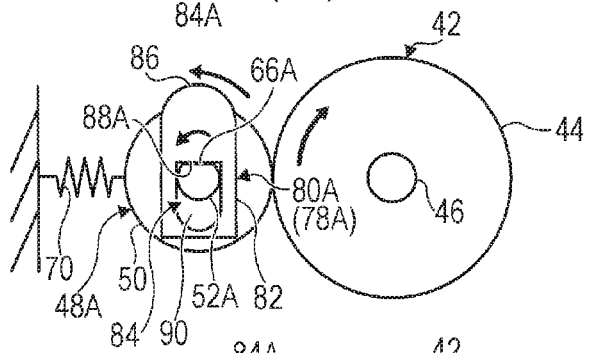
Figure 5D:
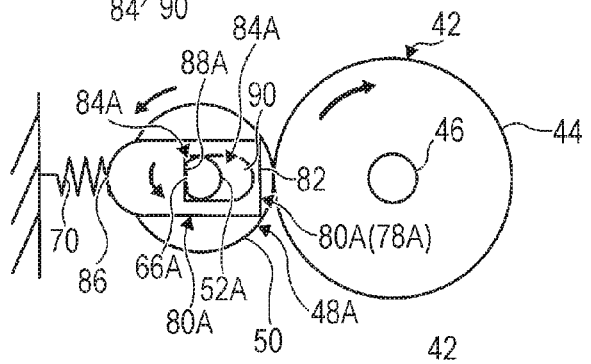
Figure 5E:
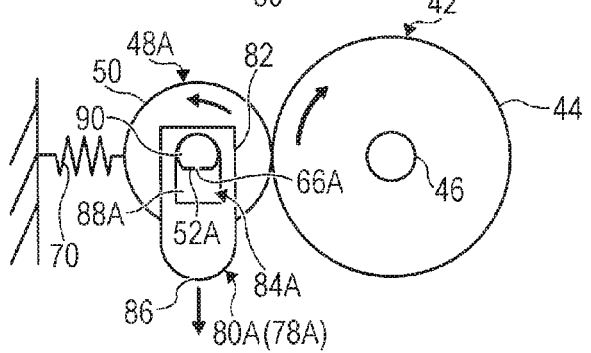

Subsequently, as illustrated in FIGS. 5C and 5D, the spacing member 80A further rotates with the catching portion 88A of the opening 84A thereof catching the hook part 66A of the second shaft portion 52. When the side of the spacing member 80A that serves as the supporting portion 86 starts to move downward from the horizontal position, the side of the spacing member 80A that serves as the supporting portion 86 is pulled by the gravitational force and is oriented downward. Consequently, as illustrated in FIG. 5E, the hook part 66A of the second shaft portion 52A that has been in the catching portion 88A of the opening 84A moves to the idling portion 90. Thus, the second shaft portion 52A rotates idle in the idling portion 90. Hence, the spacing member 80A stops rotating.

Second Modification

A spacing device and an image forming apparatus according to a second modification of the first exemplary embodiment will now be described with reference to FIGS. 6A to 6E. Elements that are the same as those of the spacing device 78 and the image forming apparatus 10 according to the first exemplary embodiment are denoted by corresponding ones of the reference numerals used in the first exemplary embodiment, and detailed description thereof is omitted.

The second modification illustrated in FIGS. 6A to 6E employs a second shaft portion 52B having a circular cylindrical shape or a substantially circular cylindrical shape with a hook part 66B provided in the form of a groove extending in the longitudinal direction of the second shaft portion 52B. A spacing member 80B included in a spacing device 78B has a catching portion 88B provided in the form of a projection projecting in an opening 84B. The catching portion 88B is to be fitted into the hook part 66B provided in the form of a groove. In FIGS. 6A to 6E, the bearing 68 is not illustrated.

Figure 6A:
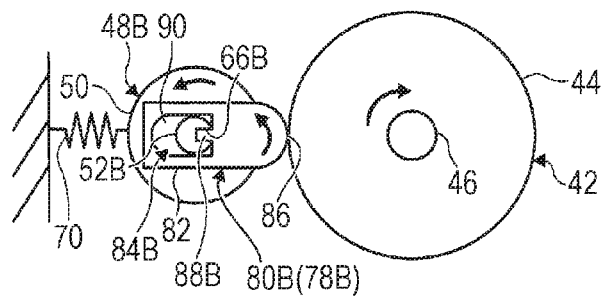
FIGS. 6A to 6E are side views illustrating a way in which a spacing device according to a second modification of the first exemplary embodiment works.
Figure 6B:
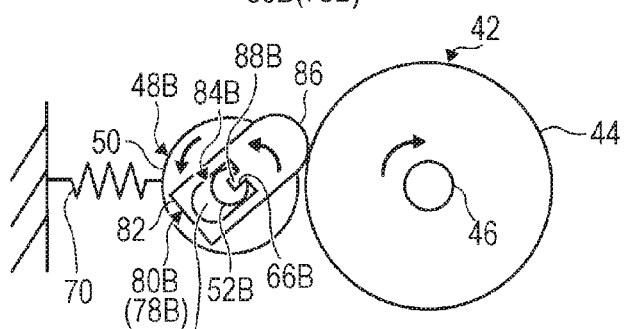

A way in which the spacing device 78B according to the second modification works is as follows. In FIG. 6A, a transfer device 48B and the image carrying body 42 are spaced apart from each other by the spacing member 80B. When the image carrying body 42 rotates clockwise in FIG. 6A, the spacing member 80B provided on the second shaft portion 52B of the transfer device 48B rotates counterclockwise and causes the transfer device 48B to rotate counterclockwise. When the spacing member 80B rotates in such a manner, the transfer roller 50 of the transfer device 48B and the image-carrying-body drum 44 of the image carrying body 42 come into contact with each other (as illustrated in FIG. 6B).

Figure 6C:
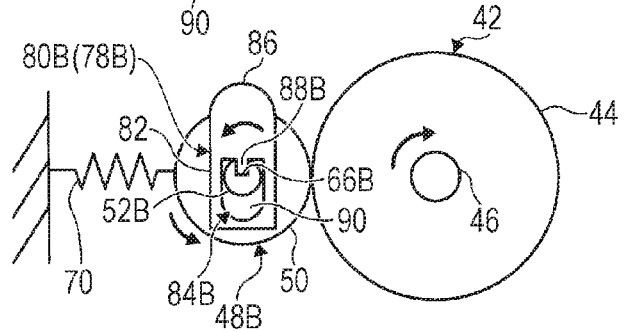
Figure 6D:
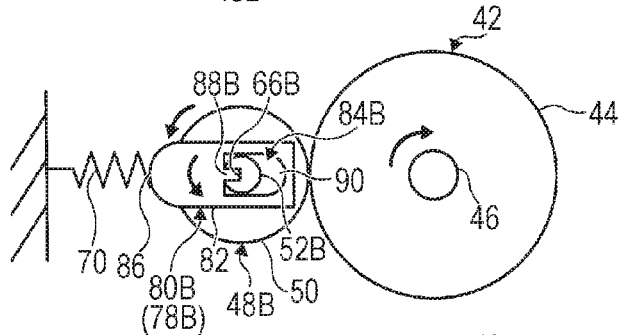
Figure 6E:
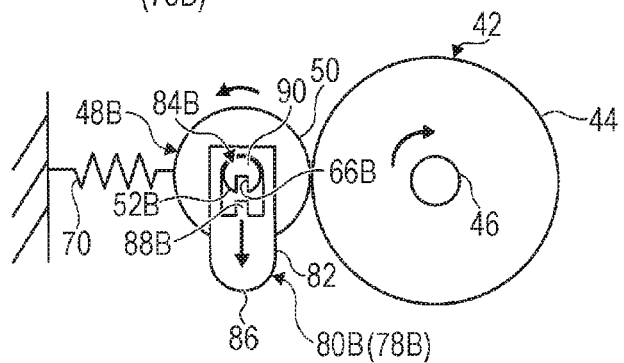

Subsequently, as illustrated in FIGS. 6C and 6D, the spacing member 80B further rotates with the catching portion 88B of the opening 84B thereof catching the hook part 66B of the second shaft portion 52B. When the side of the spacing member 80B that serves as the supporting portion 86 starts to move downward from the horizontal position, the side of the spacing member 80B that serves as the supporting portion 86 is pulled by the gravitational force and is oriented downward. Consequently, as illustrated in FIG. 6E, the hook part 66B of the second shaft portion 52B that has been in the catching portion 88B of the opening 84B moves to the idling portion 90. Thus, the hook part 66B of the second shaft portion 52B rotates idle in the idling portion 90. Hence, the spacing member 80B stops rotating.

Figure 7A:
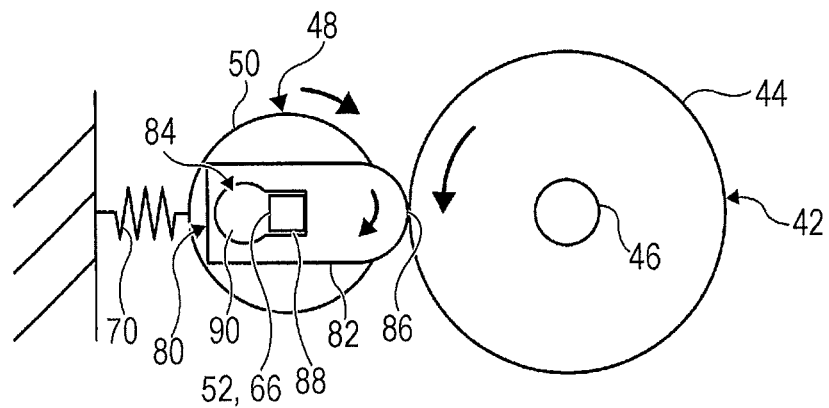
FIGS. 7A to 7C are side views illustrating another way in which the spacing device according to the first exemplary embodiment works.
Figure 7B:
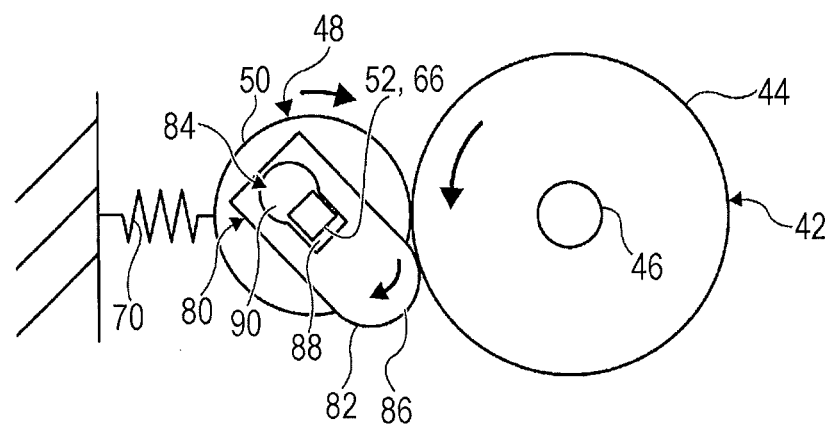
Figure 7C:
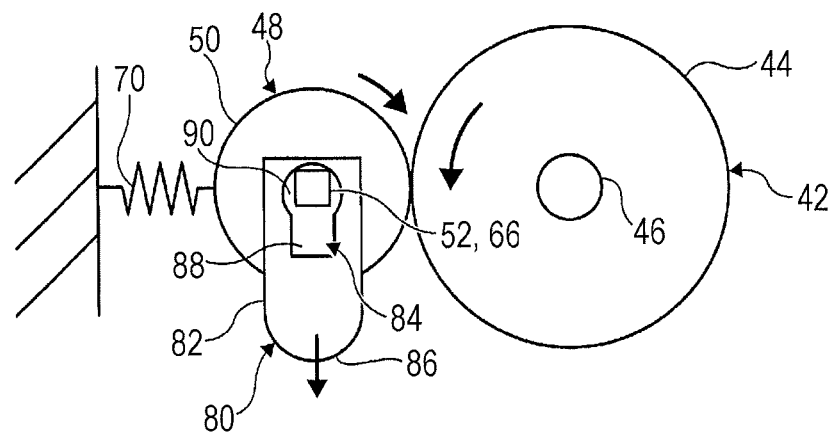

In the image forming apparatus 10 according to the first exemplary embodiment, the image carrying body 42 is rotated clockwise in FIG. 3B. The present invention is not limited to such a case. As illustrated in FIGS. 7A to 7C, the image carrying body 42 may be rotated counterclockwise. If the image carrying body 42 is rotated counterclockwise as illustrated in FIG. 7A, the spacing member 80 and the transfer device 48 rotate clockwise.

When the spacing member 80 rotates by a certain angle, referring now to FIG. 7B, the spacing of the image carrying body 42 and the transfer device 48 by the spacing member 80 is disabled, allowing the image carrying body 42 and the transfer device 48 to come into contact with each other. Subsequently, when the side of the spacing member 80 that serves as the supporting portion 86 starts to move downward from the horizontal position, the side of the spacing member 80 that serves as the supporting portion 86 is pulled by the gravitational force and is oriented downward.

Consequently, as illustrated in FIG. 7C, the hook part 66 of the second shaft portion 52 that has been in the catching portion 88 of the opening 84 provided in the spacing member 80 moves to the idling portion 90. Thus, the hook part 66 of the second shaft portion 52 rotates idle in the idling portion 90. Hence, the spacing member 80 stops rotating. In FIGS. 7A to 7C, the bearing 68 is not illustrated.

Second Exemplary Embodiment

The first exemplary embodiment concerns the spacing device 78 including the spacing members 80 that are provided to the transfer device 48 corresponding to the second rotating body. A second exemplary embodiment concerns an image forming apparatus 10D and a spacing device 78D including the spacing members 80 that are provided to an image carrying body 42D corresponding to the first rotating body. Elements that are the same as those of the spacing device 78 and the image forming apparatus 10 according to the first exemplary embodiment are denoted by corresponding ones of the reference numerals used in the first exemplary embodiment, and detailed description thereof is omitted.

Figure 8A:
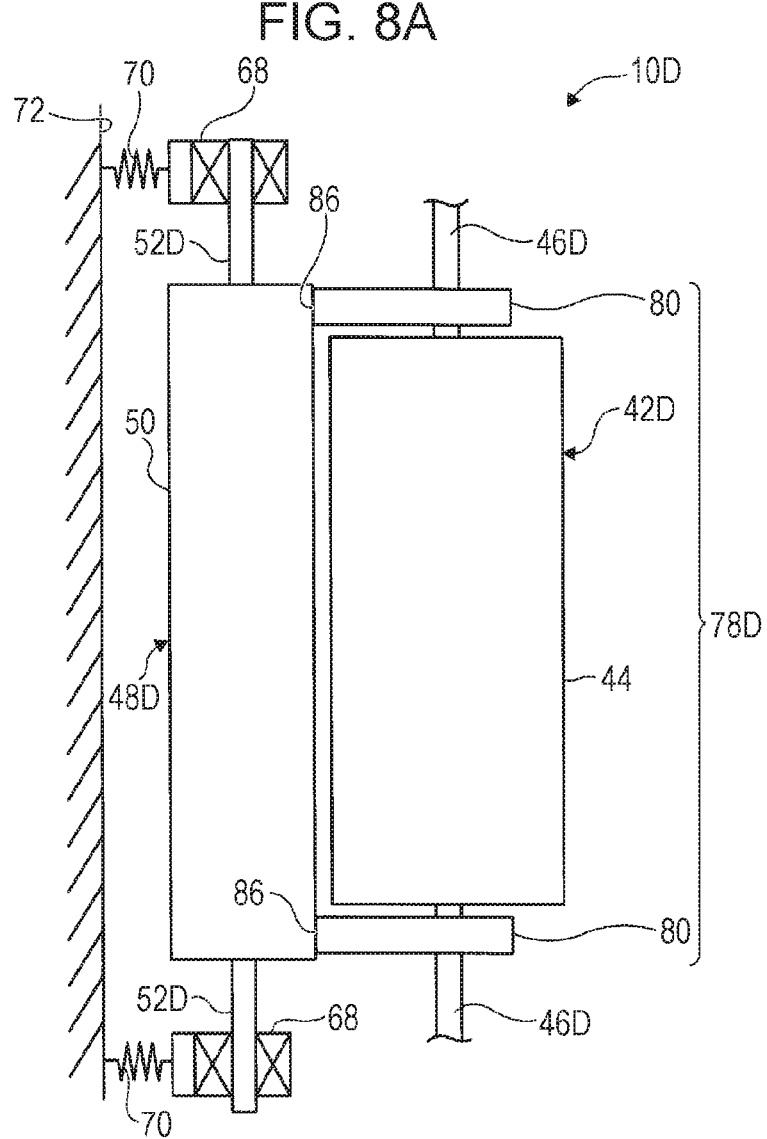
FIGS. 8A and 8B are a plan view and a side view, respectively, illustrating a first rotating body, a second rotating body, and a spacing device of an image forming apparatus according to a second exemplary embodiment that is yet to be used.
Figure 8B:
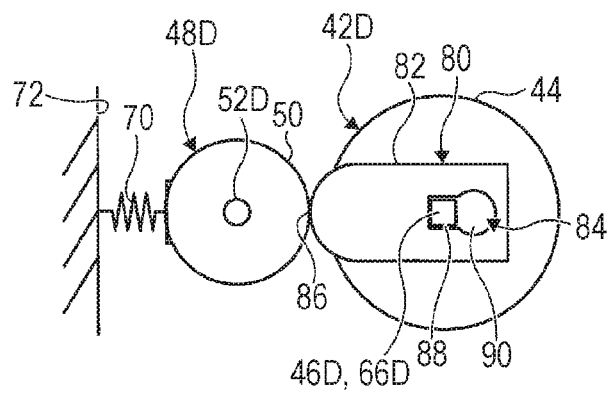

As illustrated in FIGS. 8A and 8B, the image carrying body 42D according to the second exemplary embodiment includes the image-carrying-body drum 44 having a predetermined diameter, and a first shaft portion 46D extending through the image-carrying-body drum 44 with two ends thereof projecting from two respective ends of the image-carrying-body drum 44. The ends of the first shaft portion 46D are rotatably attached to the frame body (not illustrated).

A transfer device 48D according to the second exemplary embodiment includes the transfer roller 50 having a predetermined diameter, and a second shaft portion 52D extending through the transfer roller 50 with two ends thereof projecting from two respective ends of the transfer roller 50. The ends of the second shaft portion 52D are attached to the respective bearings 68 that are provided with the respective urging members 70 such as springs.

The transfer roller 50 of the transfer device 48D is longer than the image-carrying-body drum 44 of the image carrying body 42D. The spacing members 80 are provided on the first shaft portion 46D and on two respective sides of the image-carrying-body drum 44, which is shorter than the transfer roller 50, in such a manner as to face the transfer roller 50.

The spacing device 78D according to the second exemplary embodiment includes the spacing members 80 that are provided on the first shaft portion 46D of the image carrying body 42D. In the image forming apparatus 10D that is yet to be used, the image carrying body 42D and the transfer device 48D are spaced apart from each other by the spacing members 80.

The spacing members 80 according to the second exemplary embodiment have the same configuration as the spacing members 80 according to the first exemplary embodiment, and detailed description thereof is therefore omitted.

Figure 9A:
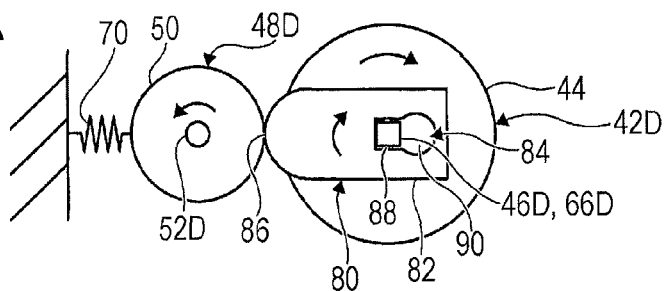
FIGS. 9A to 9E are side views illustrating a way in which the spacing device according to the second exemplary embodiment works.

A way in which the spacing device 78D according to the second exemplary embodiment works will now be described with reference to FIGS. 8A to 9E. In FIGS. 9A to 9E, the bearing 68 is not illustrated. In the image forming apparatus 10D that is yet to be used, each of the spacing members 80 of the spacing device 78D is oriented in such a manner as to space the transfer device 48D and the image carrying body 42D apart from each other as illustrated in FIGS. 8A, 8B, and 9A. In this state, the urging member 70 provided to the transfer device 48D is pushing the spacing member 80 toward the image carrying body 42D. Furthermore, a hook part 66D of the first shaft portion 46D is in the catching portion 88 of the opening 84. Hence, the spacing member 80 is prevented from moving.

At the first use of the image forming apparatus 10D, the image carrying body 42D receives power (not illustrated) and rotates clockwise in FIG. 9A. Following the rotation of the image carrying body 42D, the spacing member 80 provided on the first shaft portion 46D rotates while catching the hook part 66D of the first shaft portion 46D at the catching portion 88 of the opening 84 thereof. The clockwise rotation of the spacing member 80 is transmitted to the transfer device 48D supported by the spacing member 80, whereby the transfer device 48D rotates counterclockwise.

Figure 9B:
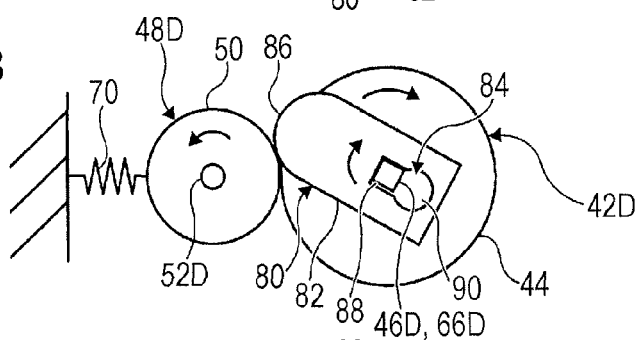

When the spacing member 80 rotates by a certain angle, referring now to FIG. 9B, the supporting portion 86 of the spacing member 80 that has supported the transfer roller 50 of the transfer device 48D goes out of contact with the transfer roller 50. Hence, the transfer roller 50 and the image-carrying-body drum 44 of the image carrying body 42D come into contact with each other because the urging member 70 provided to the transfer device 48D is pushing the transfer device 48D toward the image carrying body 42D.

Figure 9C:
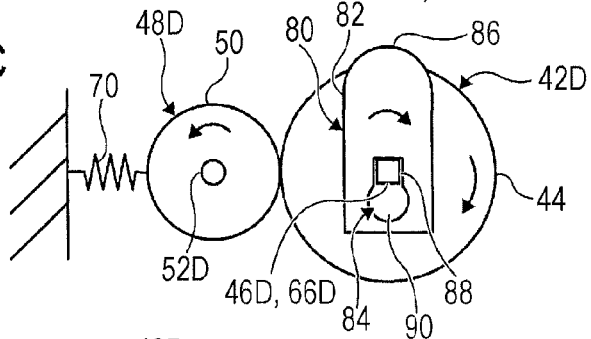
Figure 9D:
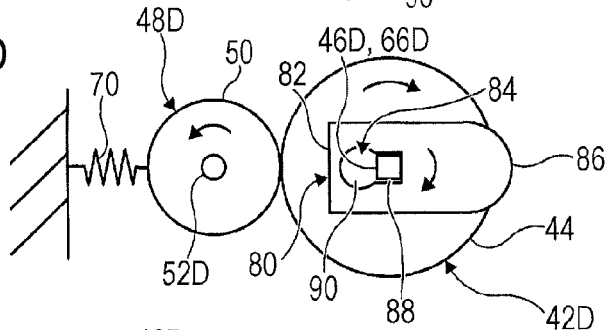

The rotation of the image carrying body 42D causes the spacing member 80 to further rotate as illustrated in FIGS. 9C and 9D. In this process, since the catching portion 88 of the opening 84 is catching the hook part 66D of the first shaft portion 46D, the spacing member 80 rotates with the rotation of the first shaft portion 46D.

Figure 9E:
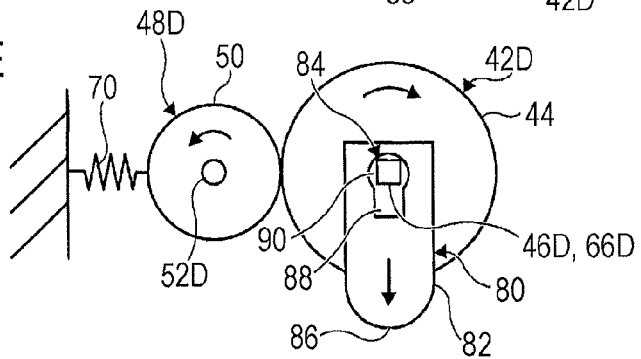

As the spacing member 80 further rotates and the side of the spacing member 80 that serves as the supporting portion 86 starts to move downward from the horizontal position, referring now to FIG. 9E, the side of the spacing member 80 that serves as the supporting portion 86 is pulled by the gravitational force and is oriented downward. In this state, the hook part 66D of the first shaft portion 46D that has been in the catching portion 88 of the opening 84 moves to the idling portion 90.

When the side of the spacing member 80 that serves as the supporting portion 86 is oriented downward in the direction of gravitational force, the hook part 66D of the first shaft portion 46D is positioned in the idling portion 90 of the opening 84. Therefore, even if the image carrying body 42D rotates, the hook part 66D of the first shaft portion 46D rotates idle in the idling portion 90. Hence, the spacing member 80 stops rotating.

In the above manner, the spacing of the transfer device 48D and the image carrying body 42D by the spacing device 78D is disabled. Consequently, as in the case illustrated in FIGS. 2A and 2B, the image forming apparatus 10D becomes ready to be used.

In the second exemplary embodiment also, the hook part 66D of the first shaft portion 46D and the catching portion 88 of the spacing member 80 of the spacing device 78D may have any of the shapes described in the first and second modifications of the first exemplary embodiment.

Figure 10A:
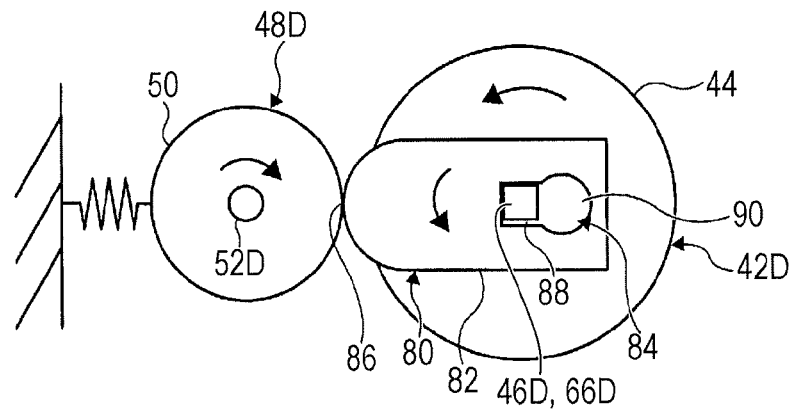
FIGS. 10A to 10C are side views illustrating another way in which the spacing device according to the second exemplary embodiment works.
Figure 10B:
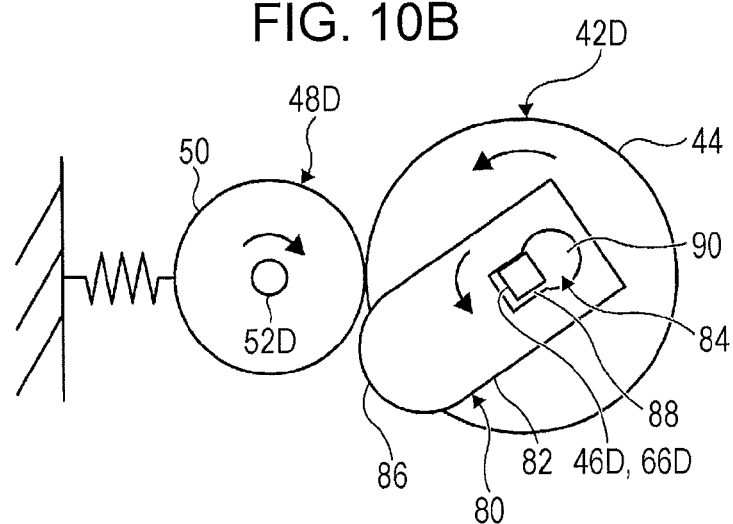
Figure 10C:
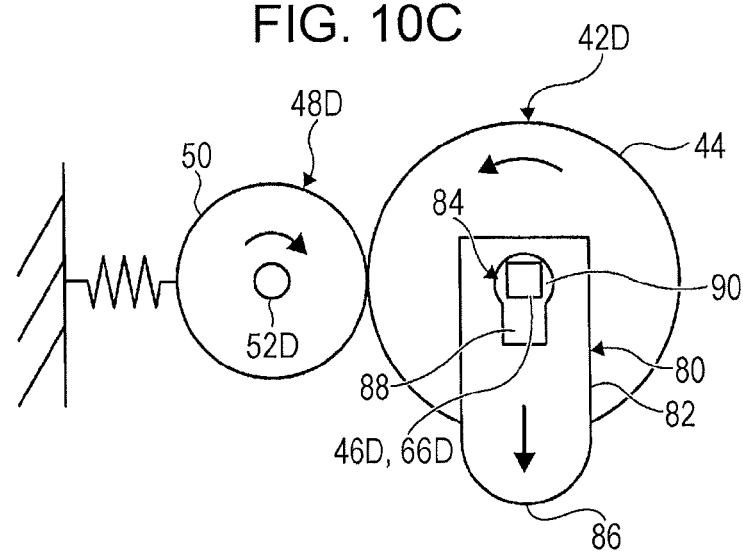

While the image carrying body 42D according to the second exemplary embodiment is rotated clockwise in FIGS. 9A to 9E, the present invention is not limited to such a case. As illustrated in FIGS. 10A to 10C, the image carrying body 42D may be rotated counterclockwise. If the image carrying body 42D is rotated counterclockwise as illustrated in FIG. 10A, the spacing member 80 also rotates counterclockwise. Accordingly, the transfer device 48D rotates clockwise.

When the spacing member 80 rotates by a certain angle, referring now to FIG. 10B, the spacing of the image carrying body 42D and the transfer device 48D by the spacing member 80 is disabled, allowing the image carrying body 42D and the transfer device 48D to come into contact with each other. Subsequently, when the side of the spacing member 80 that serves as the supporting portion 86 starts to move downward from the horizontal position, the side of the spacing member 80 that serves as the supporting portion 86 is pulled by the gravitational force and is oriented downward.

Consequently, as illustrated in FIG. 10C, the hook part 66D of the first shaft portion 46D that has been in the catching portion 88 of the opening 84 of the spacing member 80 moves to the idling portion 90. Thus, the hook part 66D of the first shaft portion 46D rotates idle in the idling portion 90. Hence, the spacing member 80 stops rotating. In FIGS. 10A to 10C, the bearing 68 is not illustrated.

Third Exemplary Embodiment

In the image forming apparatus 10 according to the first exemplary embodiment, the first rotating body corresponds to the image carrying body 42, the second rotating body corresponds to the transfer device 48, and the image carrying body 42 and the transfer device 48 are spaced apart from each other by the spacing members 80 of the spacing device 78 (see FIGS. 2A to 3B). In an image forming apparatus 110 according to a third exemplary embodiment, the first rotating body corresponds to a second transfer roller 156, the second rotating body corresponds to a supporting roller 160a that faces the second transfer roller 156, and the second transfer roller 156 and the supporting roller 160a are spaced apart from each other by the spacing members 80 included in a spacing device 78E. In the image forming apparatus 110 according to the third exemplary embodiment, a transfer-object member 152 in the form of an endless belt is interposed between the second transfer roller 156 and the supporting roller 160a (see FIGS. 11, 12A, and 12B). Elements of the spacing members 80 and the image forming apparatus 110 according to the third exemplary embodiment that are the same as those of the spacing members 80 and the image forming apparatus 10 according to the first exemplary embodiment are denoted by corresponding ones of the reference numerals used in the first exemplary embodiment, and detailed description thereof is omitted.

Figure 11:
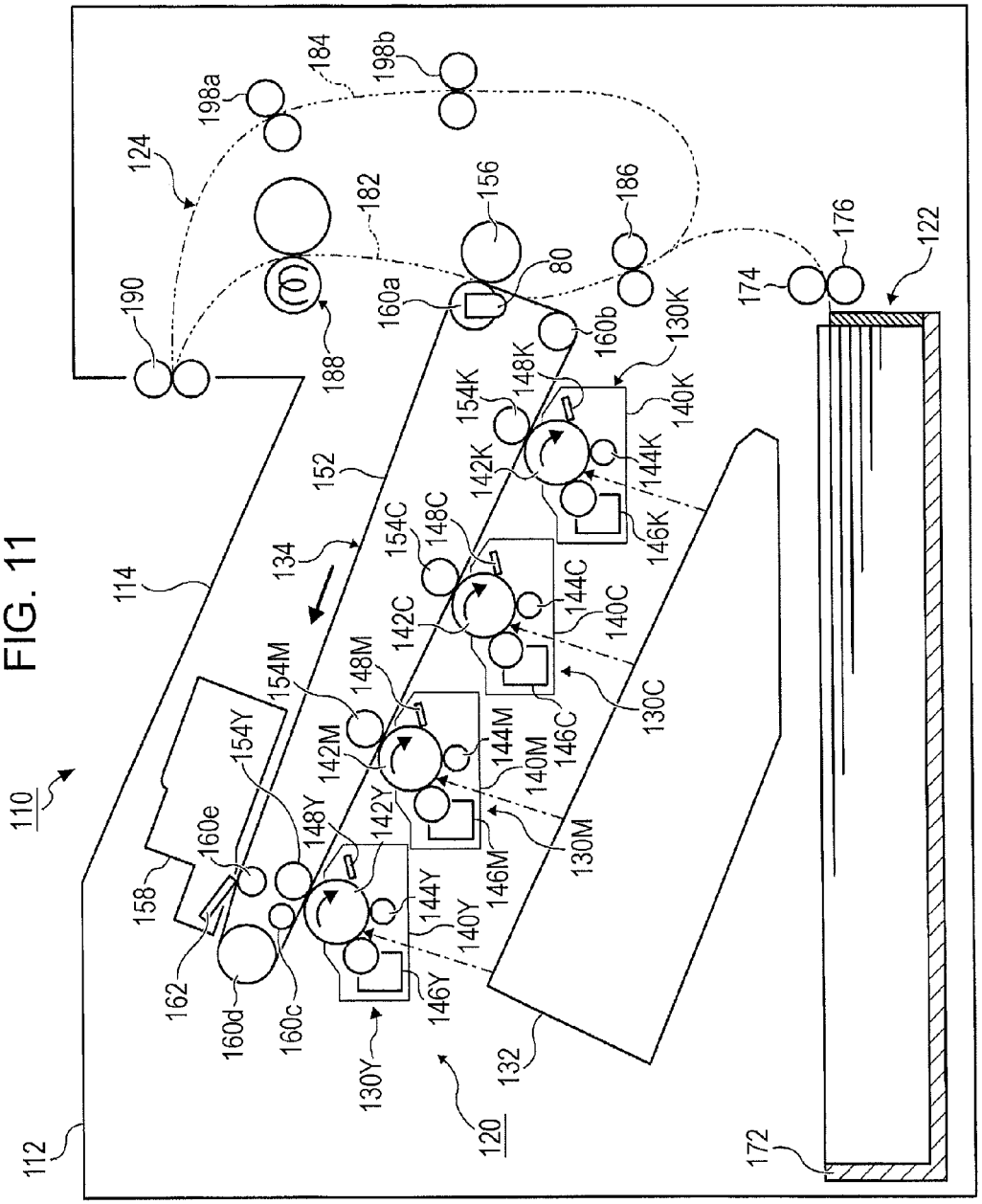
FIG. 11 is a sectional side view of an image forming apparatus according to a third exemplary embodiment.
Figure 12A:
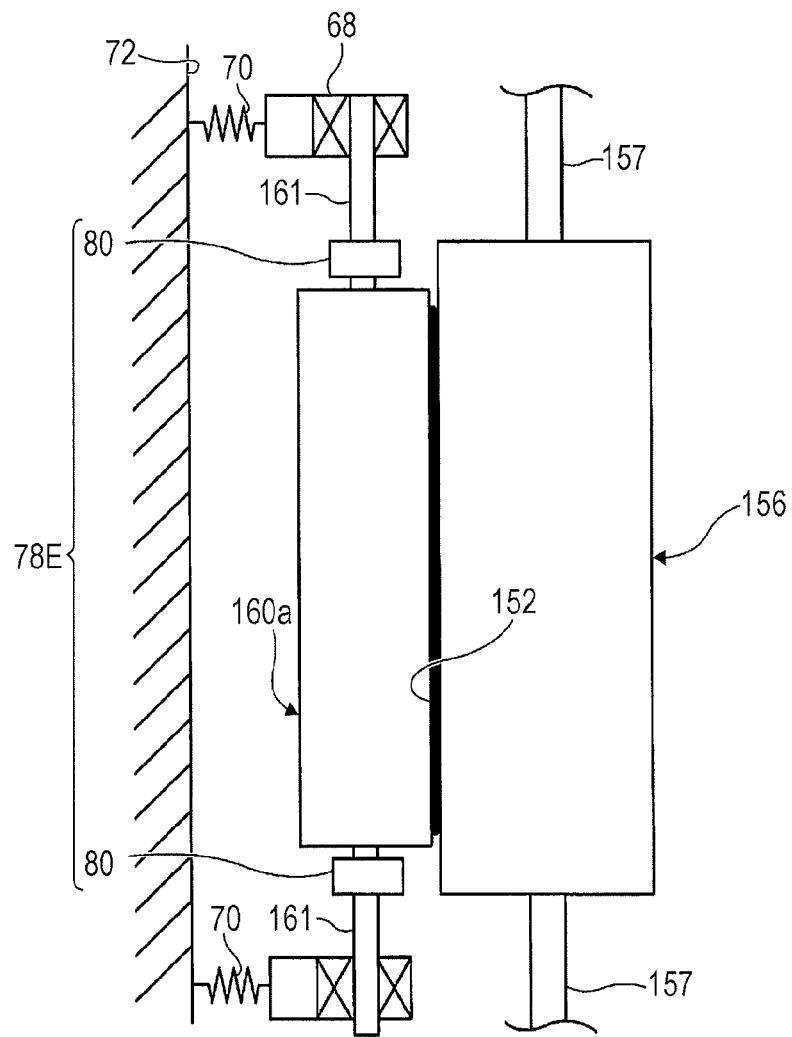
FIGS. 12A and 12B are a plan view and a side view, respectively, illustrating a first rotating body, a second rotating body, and a spacing device of the image forming apparatus according to the third exemplary embodiment that is in use.
Figure 12B:
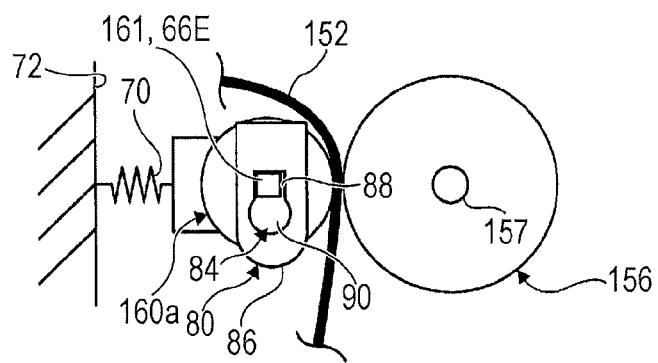

Referring to FIGS. 11, 12A, and 12B, the image forming apparatus 110 including the spacing device 78E according to the third exemplary embodiment will be described first. The image forming apparatus 110 according to the third exemplary embodiment includes an image-forming-apparatus body 112. A discharge portion 114 to which a recording medium having undergone image formation is discharged is provided on the upper surface of the image-forming-apparatus body 112.

The image-forming-apparatus body 112 houses an image forming section 120 that forms an image to be transferred to a recording medium, a recording-medium-feeding device 122 that feeds the recording medium to the image forming section 120, and a transport path 124 along which the recording medium fed from the recording-medium-feeding device 122 is transported to the discharge portion 114.

The image forming section 120 includes process cartridges 130Y, 130M, 130C, and 130K provided for four respective exemplary colors of yellow (Y), magenta (M), cyan (C), and black (K); an optical drawing device 132; and a transfer device 134. Elements included in the process cartridges 130Y, 130M, 130C, and 130K are all the same but the colors of images to be formed. Hereinafter, the suffixes Y, M, C, and K given to the reference numerals of elements for the respective colors may be omitted, and such elements are also generally denoted as, for example, "process cartridges 130."

The process cartridges 130 are, for example, electrophotographic devices that form, in combination, a color image. The process cartridges 130 each include a process cartridge body 140. The process cartridge body 140 houses an image carrying body 142 as a drum-like image carrying body on which a developer image is to be formed, a charging device 144 as a charging unit including a charging roller that evenly charges the image carrying body 142, a developing device 146 that develops, with developer (toner), a latent image to be formed on the image carrying body 142, and a cleaning device 148 that cleans the image carrying body 142 by, for example, scraping residual developer from the image carrying body 142.

The developing device 146 develops the latent image on the image carrying body 142 with developer having a corresponding one of the colors of Y, M, C, and K that is stored in the developing device 146.

The optical drawing device 132 is used as a latent-image-forming device. The optical drawing device 132 emits light to each of the image carrying bodies 142 and forms individual latent images on the respective surfaces of the image carrying bodies 142.

The transfer device 134 includes the transfer-object member 152 used as a transfer body, first transfer rollers 154Y, 154M, 154C, and 154K used as first transfer devices, the second transfer roller 156 used as a second transfer device, and a cleaning device 158.

The transfer-object member 152 is, for example, an endless belt and is supported by five supporting rollers 160a, 160b, 160c, 160d, and 160e in such a manner as to be rotatable in a direction represented by an arrow in FIG. 11.

At least one of the supporting rollers 160a, 160b, 160c, 160d, and 160e is connected to a power source (not illustrated) such as a motor and rotates by receiving power from the power source, whereby the transfer-object member 152 is rotated.

The supporting roller 160a faces the second transfer roller 156 and serves as a backup roller for the second transfer roller 156. The nip between the second transfer roller 156 and the supporting roller 160a corresponds to a second transfer position.

The first transfer rollers 154 transfer the developer images formed on the surfaces of the respective image carrying bodies 142 by the respective developing devices 146 to the transfer-object member 152.

The second transfer roller 156 transfers the developer images in the colors of Y, M, C, and K that have been transferred to the transfer-object member 152 to a recording medium.

As illustrated in FIGS. 12A and 12B, the second transfer roller 156 is provided with a first shaft portion 157 extending through the second transfer roller 156 with two ends thereof projecting from two respective ends of the second transfer roller 156. The ends of the first shaft portion 157 are rotatably attached to a frame body (not illustrated). The supporting roller 160a is provided with a second shaft portion 161 extending through the supporting roller 160a with two ends thereof projecting from two respective ends of the supporting roller 160a. The ends of the second shaft portion 161 are attached to the respective bearings 68 that are provided with the urging members 70 such as springs. The supporting roller 160a is pushed toward the second transfer roller 156 by the urging members 70 attached to the frame body 72 on the side of the supporting roller 160a, with the transfer-object member 152 interposed between the supporting roller 160a and the second transfer roller 156. The second transfer roller 156 is longer than the supporting roller 160a.

The spacing members 80 included in the spacing device 78E are provided on the second shaft portion 161 and on two respective sides of the supporting roller 160a, which is shorter than the second transfer roller 156, in such a manner as to face the second transfer roller 156.

The spacing members 80 according to the third exemplary embodiment have the same configuration as the spacing members 80 according to the first exemplary embodiment, and detailed description thereof is omitted.

The cleaning device 158 includes a scraping member 162 that scrapes, after the developer images in the respective colors are transferred to the recording medium by the second transfer roller 156, residual developer including particles having the different colors from the surface of the transfer-object member 152. The developer thus scraped by the scraping member 162 is collected to the body of the cleaning device 158.

The recording-medium-feeding device 122 includes a recording medium container 172 that contains a stack of recording media, a transport roller 174 that picks up the top one of the recording media stacked in the recording medium container 172 and transports the recording medium toward the image forming section 120, and a retard roller 176 that prevents the simultaneous transport of plural recording media to the image forming section 120 by dragging any recording media that have been picked up together with the top one.

The transport path 124 includes a common transport path 182 and a reversal transport path 184.

The recording medium fed from the recording-medium-feeding device 122 is transported along the common transport path 182 to the image forming section 120 and, after undergoing image formation, is discharged to the discharge portion 114. The common transport path 182 is provided with, in order from the upstream side in the direction of transport of the recording medium, the transport roller 174, the retard roller 176, a pair of registration rollers 186, the transfer device 134, a fixing device 188, and a pair of discharge rollers 190.

In the reversal transport path 184, the recording medium on one side of which a developer image has been formed is reversed and is transported toward the image forming section 120 again. The reversal transport path 184 is provided with, for example, two pairs of reversal transport rollers 198a and 198b.

Figure 13A:
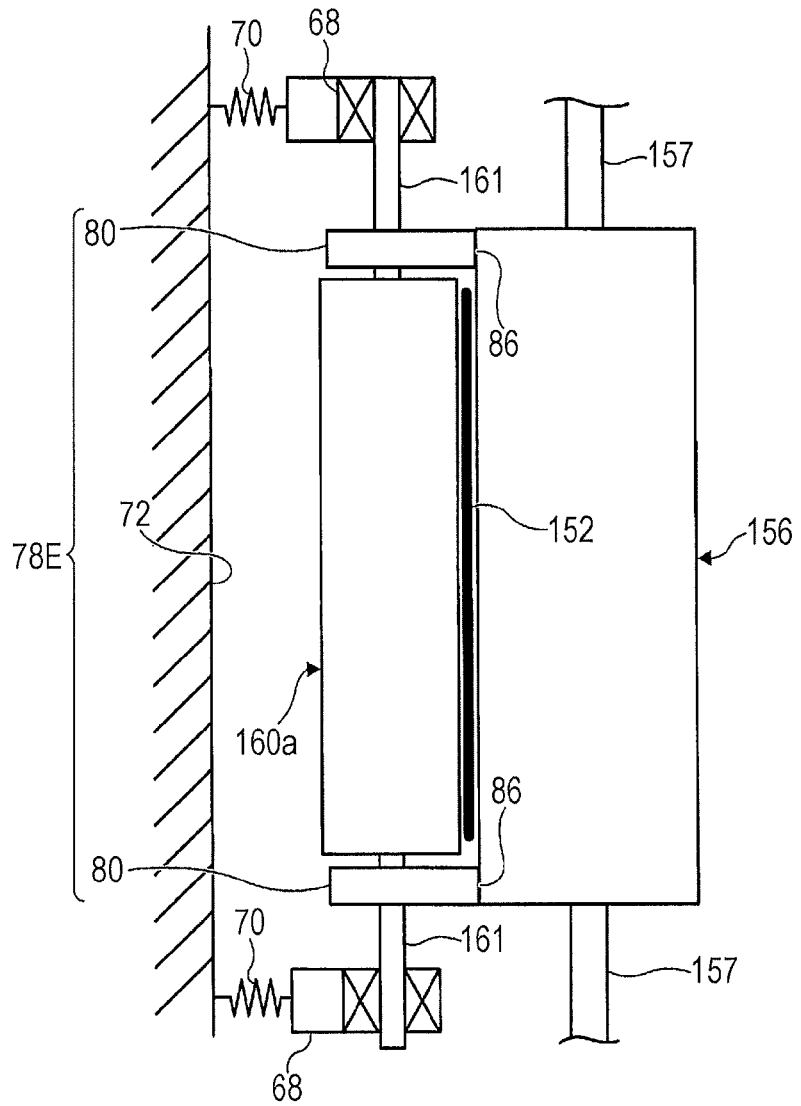
FIGS. 13A and 13B are a plan view and a side view, respectively, illustrating the first rotating body, the second rotating body, and the spacing device of the image forming apparatus according to the third exemplary embodiment that is yet to be used.
Figure 13B:
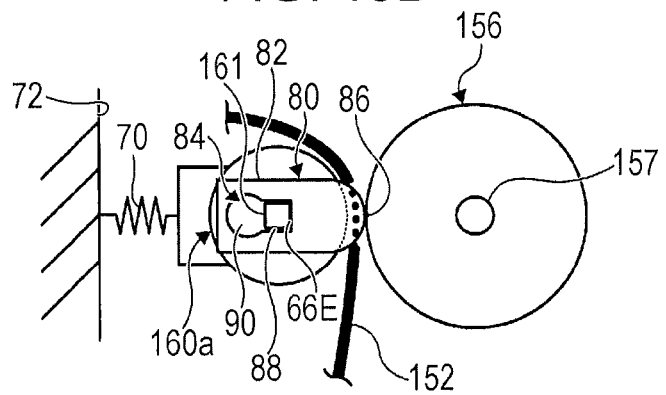

Referring now to FIGS. 13A to 14E, a way in which the spacing device 78E according to the third exemplary embodiment works will be described. In FIGS. 14A to 14E, the bearing 68 is not illustrated. In the image forming apparatus 110 that is yet to be used, each of the spacing members 80 of the spacing device 78E is oriented in such a manner as to space the supporting roller 160a and the second transfer roller 156 apart from each other as illustrated in FIGS. 13A, 13B, and 14A, with the transfer-object member 152 extending through the gap between the two. In this state, the spacing member 80 is being pushed toward the second transfer roller 156 by the urging member 70 attached to the supporting roller 160a. Furthermore, a hook part 66E of the second shaft portion 161 is in the catching portion 88 of the opening 84. Hence, the spacing member 80 is prevented from moving.

Figure 14A:
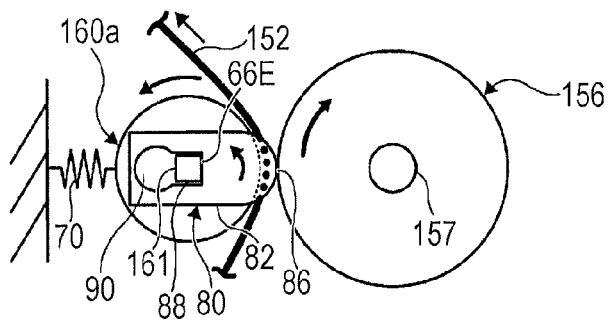
FIGS. 14A to 14E are side views illustrating a way in which the spacing device according to the third exemplary embodiment works.

At the first use of the image forming apparatus 110, the transfer-object member 152 rotates counterclockwise in FIG. 14A. Following the rotation of the transfer-object member 152, the supporting roller 160a rotates counterclockwise. Following the rotation of the supporting roller 160a, the spacing member 80 provided on the second shaft portion 161 of the supporting roller 160a rotates counterclockwise as illustrated in FIG. 14A. Furthermore, following the rotation of the spacing member 80, the second transfer roller 156 that is in contact with the spacing member 80 rotates clockwise in FIG. 14A.

Figure 14B:
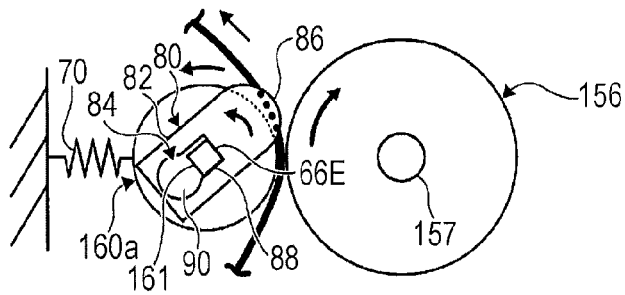

When the spacing member 80 rotates by a certain angle, referring now to FIG. 14B, the supporting portion 86 of the spacing member 80 that has supported the second transfer roller 156 goes out of contact with the second transfer roller 156. Hence, the supporting roller 160a comes close to the second transfer roller 156, and the transfer-object member 152 interposed therebetween is nipped therebetween because the urging member 70 provided to the supporting roller 160a is pushing the supporting roller 160a toward the second transfer roller 156.

Figure 14C:
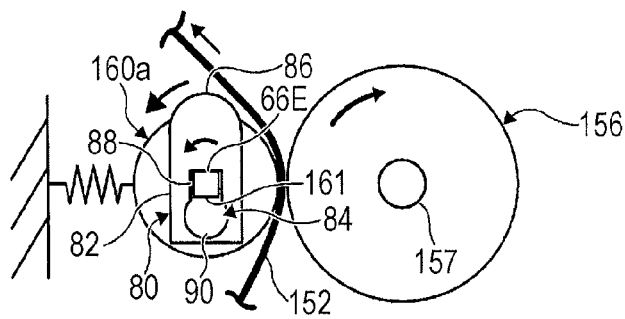
Figure 14D:
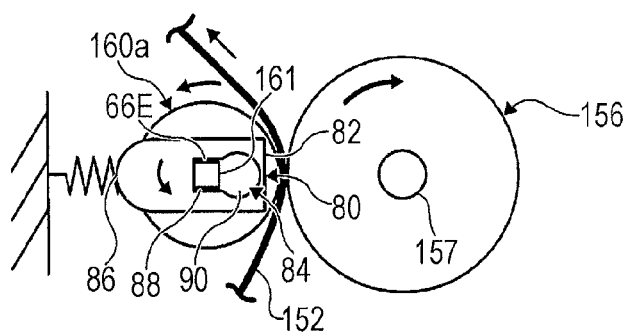

The rotation of the supporting roller 160a achieved by the rotation of the transfer-object member 152 causes the spacing member 80 to further rotate as illustrated in FIGS. 14C and 14D. In this process, since the catching portion 88 of the opening 84 is catching the hook part 66E of the second shaft portion 161, the spacing member 80 rotates with the rotation of the second shaft portion 161.

Figure 14E:
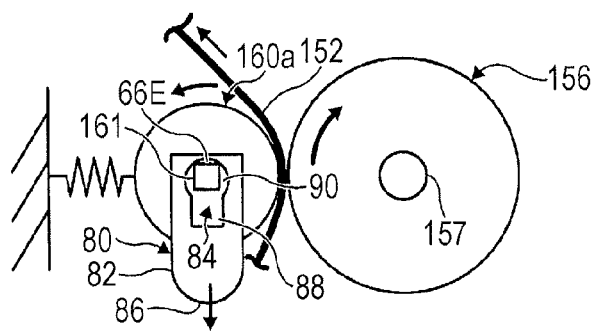

As the spacing member 80 further rotates and the side of the spacing member 80 that serves as the supporting portion 86 starts to move downward from the horizontal position, referring now to FIG. 14E, the side of the spacing member 80 that serves as the supporting portion 86 is pulled by the gravitational force and is oriented downward. In this state, the second shaft portion 161 that has been in the catching portion 88 of the opening 84 moves to the idling portion 90.

When the side of the spacing member 80 that serves as the supporting portion 86 is oriented downward in the direction of gravitational force, the second shaft portion 161 is positioned in the idling portion 90 of the opening 84. Therefore, even if the supporting roller 160a rotates, the second shaft portion 161 rotates idle in the idling portion 90. Hence, the spacing member 80 stops rotating.

In the above manner, the spacing of the supporting roller 160a and the second transfer roller 156 by the spacing device 78E is disabled, and the transfer-object member 152 is nipped between the supporting roller 160a and the second transfer roller 156. Consequently, as illustrated in FIGS. 11, 12A, and 12B, the image forming apparatus 110 becomes ready to be used.

While the spacing member 80 of the spacing device 78E according to the third exemplary embodiment is provided to the supporting roller 160a, the present invention is not limited to such a case. The spacing member 80 may be provided to the second transfer roller 156.

Moreover, the shape of the hook part 66E of the second shaft portion 161 and the shape of the catching portion 88 of the spacing member 80 according to the third exemplary embodiment may be changed as described in the first or second modification of the first exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A spacing device comprising:
    at least one spacing member that spaces a first rotating body and a second rotating body apart from each other, the first rotating body having a first shaft portion, the second rotating body having a second shaft portion, one of the first rotating body and the second rotating body being movable toward and coming into contact with another,
    wherein the spacing member is provided on one of the first shaft portion and the second shaft portion and includes
        a supporting portion that supports one of the first rotating body and the second rotating body that is free of the spacing member; and
        a portion having an opening through which the one of the first shaft portion and the second shaft portion extends, the opening including an idling portion and a catching portion, the idling portion allowing a hook part included in the one of the first shaft portion and the second shaft portion to rotate idle, the catching portion being provided between the supporting portion and the idling portion and catching the hook part,
    wherein the first rotating body and the second rotating body are spaced apart from each other when the hook part is in the catching portion of the spacing member and the one of the first rotating body and the second rotating body is supported by the supporting portion of the spacing member, and wherein the first rotating body and the second rotating body are allowed to rotate when the one of the first rotating body and the second rotating body is rotated and causes the spacing member to rotate until the supporting portion of the spacing member is oriented downward in a direction of gravitational force and the hook part that has been in the catching portion of the spacing member moves to the idling portion.

2. The spacing device according to claim 1, wherein the idling portion is provided across a center of mass of the spacing member from the supporting portion.

3. The spacing device according to claim 1, wherein another one of the first rotating body and the second rotating body that is provided with the spacing member is shorter than the one of the first rotating body and the second rotating body that is free of the spacing member, and the spacing member is provided on a part of the one of the first shaft portion and the second shaft portion in such a manner as to face the longer one of the first rotating body and the second rotating body.

4. The spacing device according to claim 1, wherein the supporting portion has a substantially curved shape.

5. The spacing device according to claim 1, wherein the hook part has a substantially polygonal cross-sectional shape.

6. The spacing device according to claim 1,
wherein the one of the first shaft portion and the second shaft portion has a substantially circular cylindrical shape,
wherein at least a part of the one of the first shaft portion and the second shaft portion is a substantially flat part serving as the hook part and extending in a longitudinal direction of the one of the first shaft portion and the second shaft portion, and
wherein the substantially flat part is caught by the catching portion of the spacing member.

7. The spacing device according to claim 1,
wherein the one of the first shaft portion and the second shaft portion has a substantially circular cylindrical shape,
wherein at least a part of the one of the first shaft portion and the second shaft portion has a groove serving as the hook part and extending in a longitudinal direction of the one of the first shaft portion and the second shaft portion, and
wherein the spacing member has a projection serving as the catching portion and that is to be fitted into the groove.

8. An image forming apparatus comprising:
a spacing device that includes
at least one spacing member that spaces an image carrying body and a transfer device apart from each other, the image carrying body having a first shaft portion, the transfer device having a second shaft portion, one of the image carrying body and the transfer device being movable toward and coming into contact with another,
wherein the spacing member is provided on one of the first shaft portion and the second shaft portion and includes
a supporting portion that supports one of the image carrying body and the transfer device that is free of the spacing member; and
a portion having an opening through which the one of the first shaft portion and the second shaft portion extends, the opening including an idling portion and a catching portion, the idling portion allowing a hook part included in the one of the first shaft portion and the second shaft portion to rotate idle, the catching portion being provided between the supporting portion and the idling portion and catching the hook part,
wherein the image carrying body and the transfer device are spaced apart from each other by the spacing device when the hook part is in the catching portion of the spacing member and the one of the image carrying body and the transfer device is supported by the supporting portion of the spacing member, and
wherein the image carrying body and the transfer device are allowed to rotate when the one of the image carrying body and the transfer device is rotated and causes the spacing member to rotate until the supporting portion of the spacing member is oriented downward in a direction of gravitational force and the hook part that has been in the catching portion of the spacing member moves to the idling portion such that the one of the image carrying body and the transfer device moves toward the other.

9. An image forming apparatus comprising:
a spacing device that includes
at least one spacing member that spaces a second transfer roller and a supporting roller apart from each other, the second transfer roller having a first shaft portion, the supporting roller having a second shaft portion, one of the second transfer roller and the supporting roller being movable toward another,
wherein the spacing member is provided on one of the first shaft portion and the second shaft portion and includes
a supporting portion that supports one of the second transfer roller and the supporting roller that is free of the spacing member; and
a portion having an opening through which the one of the first shaft portion and the second shaft portion extends, the opening including an idling portion and a catching portion, the idling portion allowing a hook part included in the one of the first shaft portion and the second shaft portion to rotate idle, the catching portion being provided between the supporting portion and the idling portion and catching the hook part,
wherein a rotatable endless belt is interposed between the second transfer roller and the supporting roller,
wherein the second transfer roller and the supporting roller are spaced apart from each other by the spacing device when the hook part is in the catching portion of the spacing member and the one of the second transfer roller and the supporting roller is supported by the supporting portion of the spacing member, and
wherein the second transfer roller and the supporting roller are allowed to rotate with the rotation of the endless belt when the one of the second transfer roller and the supporting roller is rotated and causes the spacing member to rotate until the supporting portion of the spacing member is oriented downward in a direction of gravitational force and the hook part that has been in the catching portion of the spacing member moves to the idling portion such that the second transfer roller and the supporting roller move toward each other.

\* \* \* \* \*